United States Patent [19]

Beecham

[11] 3,851,154

[45] Nov. 26, 1974

[54] OUTPUT PREVIEW ARRANGEMENT FOR SHIFT REGISTERS

[75] Inventor: David Beecham, Allentown, Pa.

[73] Assignee: Bell Telephone Laboratories, Incorporated, Murray Hill, N.Y.

[22] Filed: Dec. 19, 1973

[21] Appl. No.: 426,077

[52] U.S. Cl. .... 235/92 SH, 235/92 LG, 307/221 R, 328/37, 235/92 R

[51] Int. Cl. .......................................... H03k 23/24

[58] Field of Search....... 235/92 SH, 92 LG, 92 CC; 328/37; 307/221 R

[56] References Cited

UNITED STATES PATENTS

| | | | |
|---|---|---|---|
| 3,571,726 | 3/1971 | Henderson | 307/221 R |
| 3,609,391 | 9/1971 | Isao Hatano et al. | 328/37 |

*Primary Examiner*—Gareth D. Shaw
*Assistant Examiner*—Joseph M. Thesz, Jr.
*Attorney, Agent, or Firm*—Richard B. Havill

[57] ABSTRACT

Two shift registers each having N stages are connected in a parallel arrangement that delays a stream of input data bits 2N–1 time slots. A first shift register drive phase is applied to input sections of stages of a first one of the shift registers and to output sections of stages of a second one of the shift registers. A second shift register drive phase is applied to output sections of stages of the first shift register and to input sections of stages of the second shift register. Bits of the stream of data are applied to the inputs of the first and second shift registers at twice the rate of the clock phases, but alternate bits are written into each register. Signals generated by the output section of the last stages of the first and second shift registers are gated respectively in concurrence with the second and first shift register drive phases and thereafter are merged into one bit stream. As a result, the merged bit stream occurs after a delay of 2N–1 time slots of the input bit rate.

3 Claims, 3 Drawing Figures

OUTPUT PREVIEW ARRANGEMENT FOR SHIFT REGISTERS

BACKGROUND OF THE INVENTION

The invention is an integrated circuit shift register arrangement providing a preview of the output bit stream.

Commercially standard integrated circuit shift registers are being built with a predetermined number of stages. Although there are shift registers having many different numbers of stages, or lengths, the number of different lengths are limited because of practical considerations.

In some electronic system arrangements, there is a need for shift registers which will delay a stream of bits approximately one time slot less than the number of time slots of delay imparted by standard commercial integrated circuit shift registers. There are some alternative arrangements of shift registers which use one less time slot, but such alternative arrangements often are impractical. For instance, a shift register can be designed with discrete components; however, for very long shift registers this alternative will result in a bulky and expensive apparatus. Also an integrated circuit chip can be custom designed to provide a shift register with one less time delay, but this alternative necessitates a costly development effort and an accumulation of additional inventory adding o to cost of the desired shift register arrangement.

Therefore, a need exists for an inexpensive shift register arrangement which will delay a stream of bits approximately one time slot less than the standard commercial shift registers so that each of the output bits can be previewed during the time slot when the bit ordinarily would be shifting through the last stage of the shift register.

SUMMARY OF THE INVENTION

It is an object of the invention to arrange conventional commercial integrated circuit shift registers to provide a preview of the output bit stream.

It is another object to simply and inexpensively provide time for previewing the output bit stream from an integrated circuit shift register arrangement.

These and other objects of the invention are realized by a combination of a parallel pair of shift registers each having N stages. A first shift register drive phase is applied to the input sections of stages of a first shift register and to the output sections of stages of a second shift register. A second shift register drive phase is applied to the output sections of stages of the first shift register and to the input sections of stages of the second shift register. Bits of an input stream of data are applied to the inputs of the first and second shift registers at a rate which is double the rate of the first and second shift register drive phases, but alternate bits are written into each register. Signals generated at the output of the last stages of the first and second shift registers are gated respectively in concurrence with the second shift register drive phase and the first shift register drive phase and thereafter are merged into a single bit stream. This output bit stream occurs at the input data rate but is delayed by 2N–1 time slots of the input data rate.

It is a feature of the invention to merge the bit streams from two shift registers connected in parallel into a single bit stream by gating each output in response to a clock phase which is complementary to the clock phase used for writing into the respective shift registers.

It is another feature to connect in a parallel arrangement two N-stage shift registers which are clocked to receive alternate bits of a data stream arriving at a rate twice the shift rate of the shift registers and to merge their outputs into a single bit stream that is delayed by 2N–1 time slots of the input bit rate.

BRIEF DESCRIPTION OF THE DRAWINGS

These and other features of the invention will be more readily understood by reference to the detailed description following if that description is considered with respect to the attached drawings wherein.

DETAILED DESCRIPTION

Figure 1:
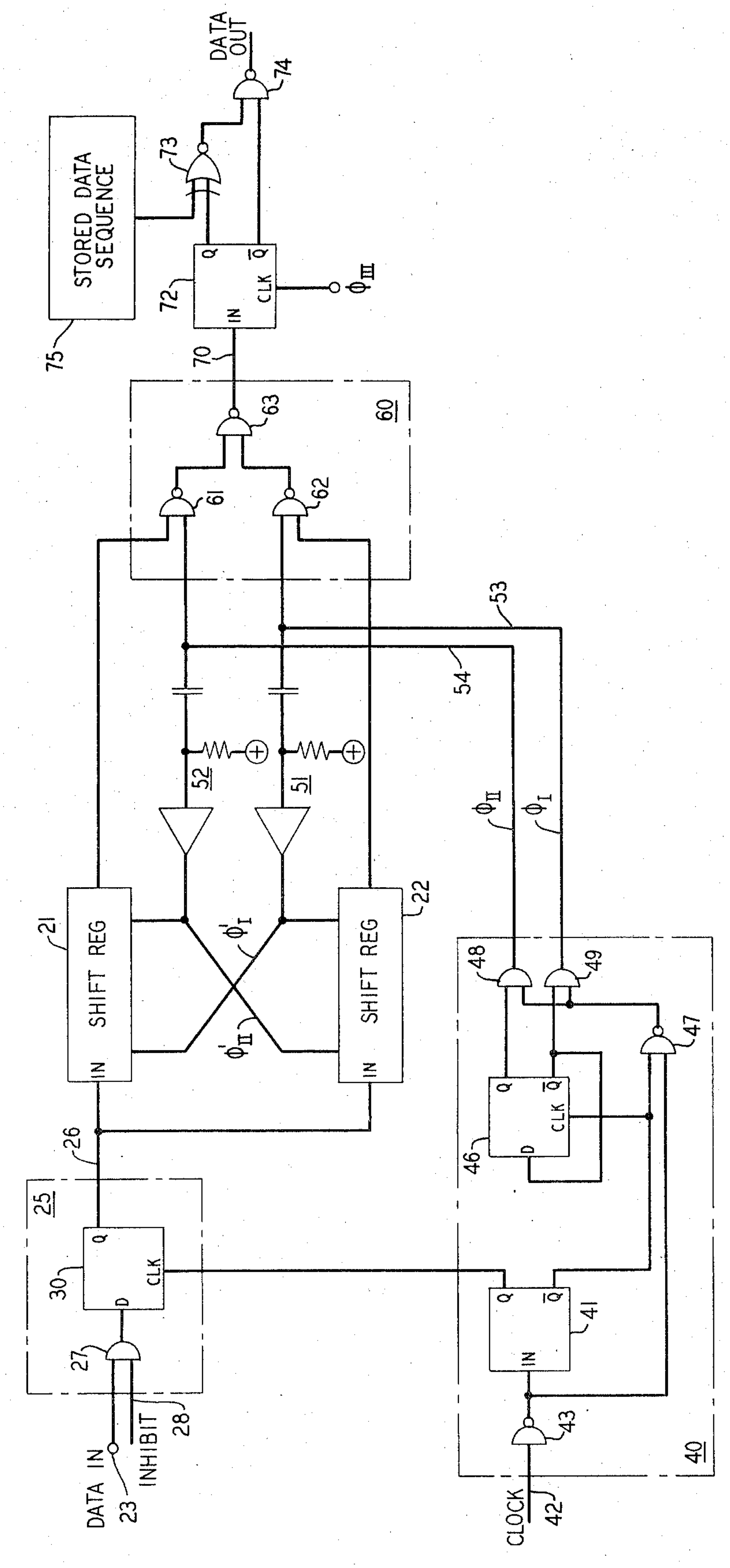
FIG. 1 is a logic diagram of an illustrative embodiment of the invention.

Referring now to FIG. 1, there is shown first and second shift registers 21 and 22 connected in a parallel arrangement for receiving a serial stream of data bits applied at a data input terminal 23. These bits are transmitted through an input circuit 25 and by way of a lead 26 are applied to the input terminals of the shift registers 21 and 22. The shift registers both are of a type operating in response to a two-phase clock for shifting bits therethrough. The bit rate of the input bit stream is twice the rate of the clock phases used for operating the shift registers. Alternate bits of the stream are written into the shift register 21, and the in-between bits are written into the shift register 22. The shift registers 21 and 22, shown as blocks in FIG. 1, may be commercially available circuits such as those shown and described in greater detail with respect to FIG. 3.

The input circuit 25 synchronizes the input data bits with the two clock phases used for operating the shift registers 21 and 22. Circuit 25 includes an AND gate 27 for receiving the input data bits on the lead 23 and inhibiting signals on a lead 28. The inhibiting signals are either a "1" or a "0" level and must be valid before or at the time slots of the received data bits. The "1" and "0" level signals respectively control the gate 27 for enabling and disabling transmission of the input data bits to an input D of a D-type flip-flop 30. The flip-flop 30 is a pulse stretcher operated in response to clock signals generated by a clock circuit 40.

Figure 2:
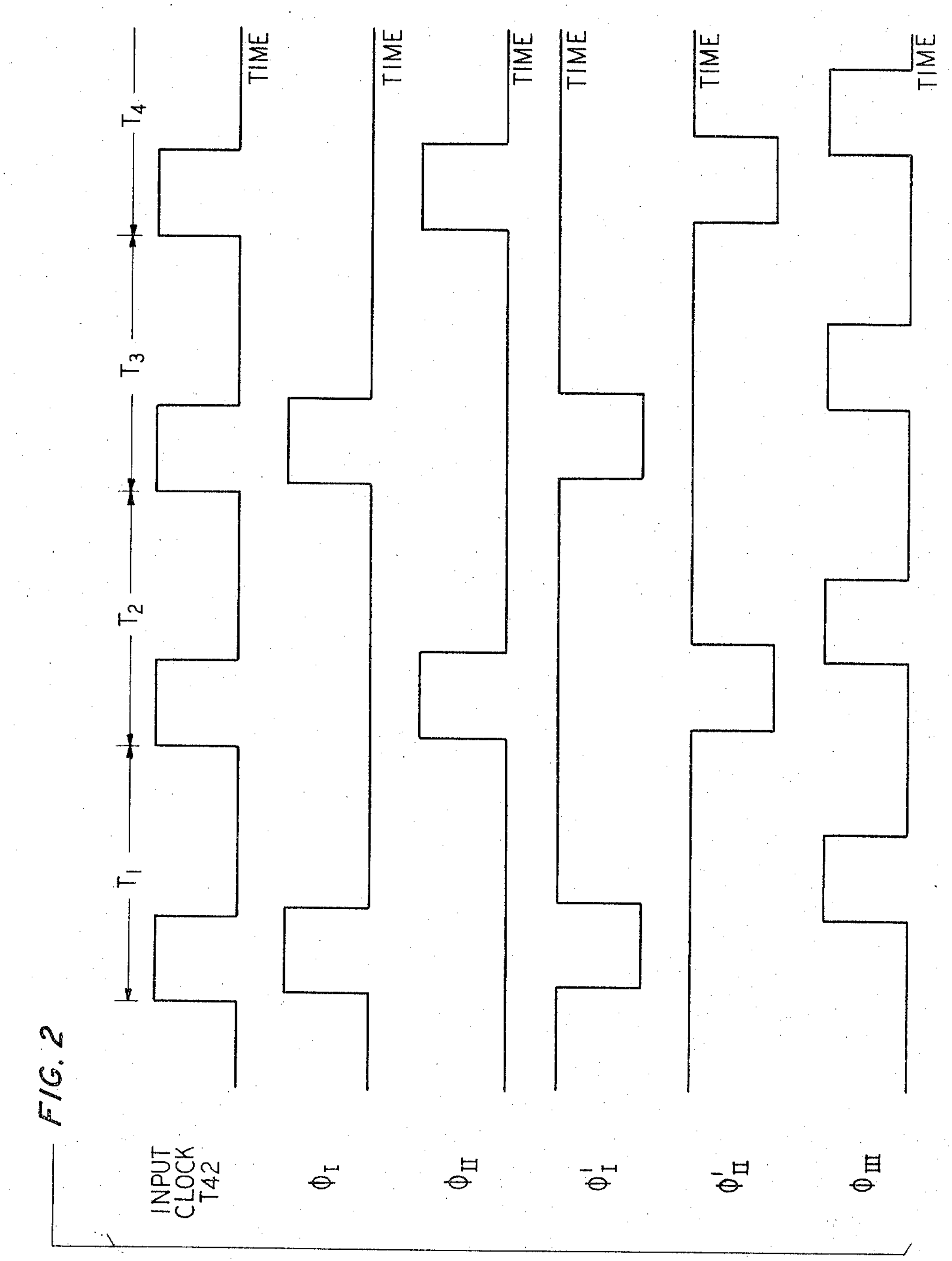
FIG. 2 is a timing diagram showing waveforms which help describe operation of the illustrative embodiment.

The clock circuit 40 is arranged to produce clock signals for controlling the input circuit 25, the shift registers 21 and 22, and an output gating circuit 60. Included within the clock circuit 40 is a one-shot multivibrator 41 which is used as a pulse stretcher. Normally, the multivibrator 41 is held in a stable state wherein a "1" is produced at output $\overline{Q}$. The multivibrator is responsive to input clock signals such as shown in FIG. 2. Those clock signals are applied to the multivibrator by way of a lead 42 and a buffer gate 43 to an input terminal IN for switching the multivibrator into a temporary stable state. The clock signals applied to the lead 42 have a positive polarity and occur at a rate that is equal to the rate of the input data bit stream being applied to the terminal 23. In response to the inverse of those clock signals, the multivibrator 41 produces repetitious waveforms at its output terminals Q and $\overline{Q}$. The repetitious waveforms are developed by the periodic switching into the temporary stable state followed by switching back to the stable state after a predetermined duration.

The output signals at the terminals Q and $\overline{Q}$ are applied respectively to a clock input CLK of the flip-flop 30 in the input circuit 25 and to a clock input CLK of the flip-flop 46 within the clock circuit 40.

The flip-flop 46 is a D-type flip-flop, which because of feedback from output terminal $\overline{Q}$ to its input terminal D, is complemented by positive-going input signal transitions that occur when the multivibrator 41 returns to its stable state. Flip-flop 46 therefore divides the input clock frequency by two and produces complementary double-rail output signals used as clock phases for operating the parallel arrangement of the pair of shift registers 21 and 22 and the output gating circuit 60. The flip-flop 46 always is set into a new state producing output signals at the terminals Q and $\overline{Q}$ while the multivibrator 41 is in its stable state.

The input clock signals applied by way of the lead 42 are fed forward through an arrangement of gates 47, 48 and 49 to precisely time transitions in the clock phases produced by the flip-flop 46. NAND gate 47 produces a "0" output when the multivibrator 41 goes into its stable state. When the next input clock pulse, a "1," is applied on the lead 42, the output of gate 43 goes low enabling the gate 47 to produce a "1," or a high, output. Thus the gate 47 produces a high output as soon as the signal from the gate 43 goes low for triggering the monostable multivibrator 41. The resulting high signal from the gate 47 is maintained by a low signal from the output $\overline{Q}$ of the multivibrator 41 until the circuit returns to its stable state. Gates 48 and 49 are enabled alternatively by signals from the complementary outputs Q and $\overline{Q}$ of the flip-flop 46 and are clocked by the output of the gate 47 to achieve precise timing.

FIG. 2 shows waveforms of the timing of the clock phases used for operating the shift register arrangement. Time slots for the clock pulses accompanying input data bits are indicated by $T_1$, $T_2$, $T_3$ and $T_4$. It is noted that the signals representing clock phases $\phi_I$ and $\phi_{II}$ are complementary but not overlapping. They have been positioned in time so that they are substantially symmetrical with each other along the time scale. The phases $\phi_I$ and $\phi_{II}$ are illustrated as slightly delayed after the clock pulses to reflect propagation delay in the circuit 40.

Figure 3:
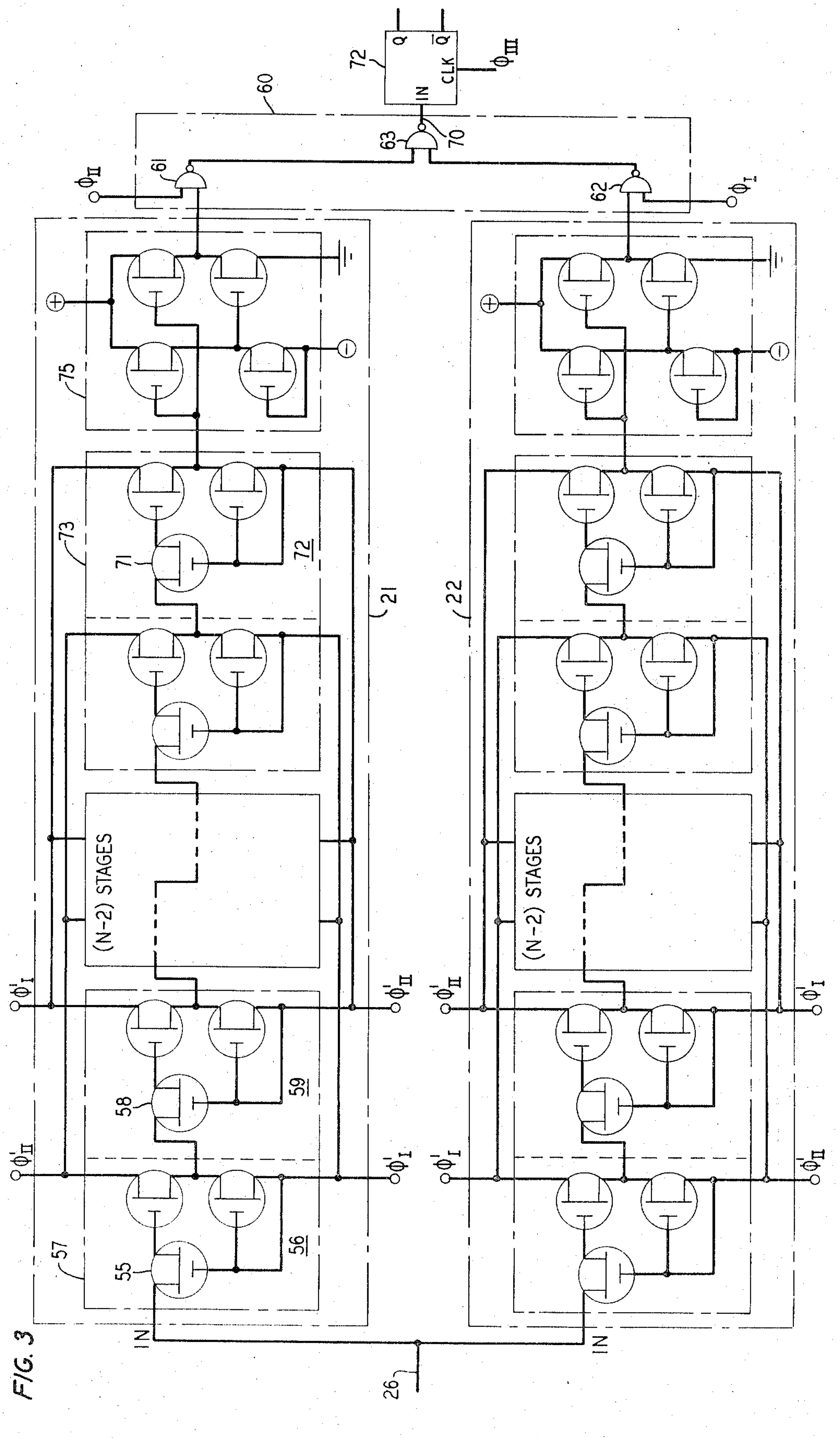
FIG. 3 is a schematic diagram of a pair of parallel connected shift registers arranged in accordance with the invention.

As shown in FIG. 3, the shift registers 21 and 22 are conventional two-phase integrated circuit shift registers. Those shift registers use p-channel, thick-oxide and low-threshold metal oxide semiconductor (MOS) technologies and are compatible with transistor-transistor logic circuits at both the input and the output terminals. Operation within the shift register stages, however, is accomplished at MOS logic levels. Therefore conversion circuits are provided for the shift register clock phases, ss shown in FIG. 1.

Power driver and level shifting circuits 51 and 52, respectively, are interposed between leads 53 and 54 and the shift registers 21 and 22. These circuits 51 and 52 are arranged for overcoming capacitive loading associated with clock inputs to the shift registers 21 and 22. In addition, the circuits 51 and 52 convert signals in transistor-transistor logic levels at the output of gates 48 and 49 to MOS logic levels.

Output signals from the circuits 51 and 52 are inverted with respect to the clock phases $\phi_I$ and $\phi_{II}$ and therefore are designated $\phi'_I$ and $\phi'_{II}$, respectively. Because of the delay associated with the circuits 51 and 52, the phases $\phi'_I$ and $\phi'_{II}$ occur slightly later than their counterparts, as shown in FIG. 2. Phases $\phi'_I$ and $\phi'_{II}$ are applied to all stages of the shift registers 21 and 22 for shifting the stream of data bits therethrough.

Referring once again to FIG. 3, the shift register 21 is arranged to receive an input bit on lead 26 through a transmission gate 55 in an input section 56 of the first stage 57 when the shift register drive phase $\phi'_I$ is low and to shift such bit through a transmission gate 58 in an output section 59 of the same stage 57 when the second shift register drive phase $\phi'_{II}$ is low. After N cycles of the shift register drive phases $\phi'_I$ and $\phi'_{II}$, the same bit is shifted through a transmission gate 71 in an output section 72 of the last stage 73 of the shift register 21 to an output buffer circuit 75. The output buffer circuit 75 provides level shifting from MOS logic levels to transistor-transistor logic levels used for subsequent logic circuitry.

Similarly, the shift register 22 is arranged to receive an input bit on lead 26 through an input transmission gate into its first stage when shift register drive phase $\phi'_{II}$ is low. Such bit is shifted through a transmission gate of the output section of the first stage when the shift register drive phase $\phi'_I$ is low. After N cycles of the shift register drive phases $\phi'_I$ and $\phi'_{II}$, the same bit is shifted to an output buffer circuit.

It has been discovered that a substantial portion of an entire time slot at the input bit rate can be saved by using the two N-stage shift registers in the parallel arrangement shown in FIGS. 1 and 3. Bits are available at the output in approximately 2N–1 clock periods of the input bit rate. In FIG. 3, the first shift register drive phase $\phi'_I$ controls the input transmission gate of each stage of the first shift register 21 and the output transmission gate of each stage of the second shift register 22. The shift register drive phase $\phi'_{II}$ controls the output transmission gate of each stage of the first shift register 21 and the input transmission gate of each stage of the second shift register 22. Because of the arrangement of the clock circuit 40, the shift register drive phases $\phi'_I$ and $\phi'_{II}$ both operate at one-half the frequency of the clock signals applied to the terminal 42. As previously mentioned, these clock signals are synchronized with the bits of the data stream being applied to the data input terminal 23.

The output signals, produced by the output buffer circuits of the shift registers 21 and 22, respectively, are produced in response to the shift register drive phases $\phi'_{II}$ and $\phi'_I$ and are applied directly to input terminals of gates 61 and 62 of the output circuit 60.

In the output circuit 60, the signals from the shift registers 21 and 22 are transmitted through the gates 61, 62, respectively, in response to the clock phases $\phi_{II}$ and $\phi_I$. Output signals produced by the gates 61 and 62 are transmitted through a NAND gate 63 to a lead 70 where the two bit streams merge. The merged stream of bits emerges from the gate 63 at the input bit rate, but the stream is delayed approximately 2N–1 time slots of the input clock. A slight additional delay is caused by propagation times required by the clock circuit 40, the shift register output circuitry, and the output gating circuitry.

It is preferable to enable gates 61 and 62 at the same time that the data is valid at the output of the shift registers, but this may not be readily accomplished with conventional components when MOS circuits and bipolar logic circuits are used in the same arrangement. The gates 61 and 62 can be enabled at an appropriate time by $\phi_{II}$ and $\phi_I$ clock signals timed so that incorrect data is ignored until the correct data is available at the output of the shift registers.

The output stream of data bits on lead 70 is applied to the input of a flip-flop 72 which is operated in response to a clock $\phi_{III}$ which may be timed as shown in FIG. 2. Each time a clock pulse occurs, the flip-flop 72 is constrained to a state agreeing with the bit on the lead 70. Thus the flip-flop 72 stores the bits of the data stream for the last time slot of the delay period.

While any bit is stored in the flip-flop 72, that bit can be previewed to determine whether or not it is to be processed further. Outputs Q and $\overline{Q}$ of the flip-flop 72 are applied respectively to an EXCL-NOR gate 73 and a NAND gate 74. A stored data sequence from a source 75 is applied to a second input of the EXCL-NOR gate 73. The output of the EXCL-NOR gate 73 is applied to a second input of the NAND gate 74.

This arrangement will compare the bits on output Q of the flip-flop 72 with the stored data sequence. As a result of the preview, the output data stream on the lead DATA OUT will be a function of the delayed input data bit stream and the stored data sequence. Thus the time slot saved in the shift register operation provides sufficient time for previewing the output bit stream prior to additional processing.

It is noted that the saving of substantially all of a time slot at the input data rate is not possible when a single shift register is used by itself. Such a single shift register necessarily must be operated by drive phases operating at the same rate as the input bit stream. For such a single shift register, the greatest possible saving of delay time is approximately one-half of a time slot. This saving may be sufficient for some purposes; however, in apparatus requiring more time for preview, the disclosed parallel arrangement of two shift registers has a distinct advantage of saving substantially all of a time slot.

The above-detailed description is illustrative of an embodiment of the invention and it is understood that additional embodiments thereof will be obvious to those skilled in the art. These additional embodiments are considered to be within the scope of the invention.

What is claimed is:

1. A shift register apparatus comprising first and second shift registers each having N stages, each stage including input and output sections having transmission gates, first and second shift register drive phases, means for applying the first shift register drive phase to the transmission gate of the input section of the first shift register and to the transmission gate of the output section of the second shift register, means for applying the second shift register drive phase to the transmission gate of the output section of the first shift register and to the transmission gate of the input section of the second shift register, means for inserting input data bits having a predetermined bit rate alternately into the first and second shift registers, and means for gating output signals from the last stage of the first shift register concurrently with the second shift register drive phase and for gating output signals from the last stage of the second shift register concurrently with the first shift register drive phase.

2. Apparatus in accordance with claim 1 further comprising means for merging the bit streams from the outputs of the first and second shift registers into a single bit stream at the predetermined bit rate and delayed by approximately 2N–1 time slots of the predetermined bit rate.

3. Apparatus in accordance with claim 2 further comprising means responsive to the occurrence of input clock pulses for generating the first and second shift register drive phases as complementary and nonoverlapping signals.

* * * * *